Patented Oct. 9, 1945

2,386,492

UNITED STATES PATENT OFFICE 2,386,492

INSECTICIDE

Menahem Merlub-Sobel, Rahway, N. J., assignor to Virginia-Carolina Chemical Corporation, Richmond, Va., a corporation of Virginia No Drawing. Application June 23, 1942,
Serial No. 448,151

2 Claims. (Cl. 167—43)

This invention relates to insecticides of the type which are customarily applied by spraying, and which comprise toxic or corrosive materials whose destructive properties not only act upon the pests for which the insecticides are designed but incidentally adversely affect the plant foliage, or animals or humans who may eat the plants that have been contaminated by the insecticides.

The general object of the invention is to control the normal adverse effects of such toxicity or corrosiveness.

The damage due to crops by insect infestation is so well known as to require no elaboration. Over the centuries, insecticides of various types have been developed to combat such infestation, but unfortunately the materials which are most toxic to insect life have the disadvantage that normally they are also toxic to animal and human life, and this has brought into play the whole question of toxic residues on plants that have been treated with poisonous insecticide. Similarly, many types of insect-toxic compounds have adverse effect on plant foliage. In general, insecticide formulation has consequently had to be a delicate balance between adequate toxicity against insect pests and protection from too aggressive a toxicity endangering the plant itself or the animal using the plant for food.

Among materials which have excellent toxic characteristics toward the control of insect infestation are the fluorides, both simple and double, such for example as the fluosilicates. Sodium fluoride, sodium fluosilicate, barium fluosilicate, etc., have been tested and found generally eligible from an entomological point of view. However, there has always been the danger of plant damage in the use of these substances particularly with the more soluble fluoride compounds; far worse, the great toxicity of fluorides to animal and human life has necessitated an extremely low fluorine residue tolerance on all plants and fruits intended for consumption as food. This low legal tolerance has proved sufficient effectively to hinder the commercial expansion of fluorine insecticides, despite their efficiency and economy.

The subject invention has for its object the utilization of the insect-toxic characteristics of fluorine compounds, as well as other materials which have similar toxic qualities, and which will be later referred to. For the present exposition, fluorine compounds are taken as the typical example.

The present invention revolves about the concept that a vaporizable fluorine compound of highly toxic and corrosive nature can be made available as an effective insecticide, while at the same time the plant is protected from its corrosive action. Because of the vaporizable nature of the fluorine compound, it will remain in contact with the plant for only a limited time. As the description of the invention proceeds, it will be evident that the time of contact can be regulated in accordance with the requirements of the situation.

For reasons of both economy as well as effectiveness, it is preferred in the case of fluorine compounds to work with the simple compounds, of which hydrofluoric acid and hydrofluosilicic acid are most common. It is obvious that spraying plants with either of these acids, even if highly dilute, would cause considerable corrosion or "burning" of the foliage as well as other untoward reactions.

However, applying the principles of the subject invention, I have found if moderately dilute solutions of either hydrofluoric acid or hydrofluosilicic acid, which are still very strong in corrosiveness, are converted into the dispersed phase of a water-in-oil type of emulsion, such an emulsion can be used as an insecticide without adverse effect on the plant. In this way, control over the duration and concentration of protection as well as the beginning of the period of release of the toxic substance is within the power of the operator. This last factor is of particular advantage where the aqueous phase of the emulsion contains a highly lethal fumigant such as hydrocyanic acid, in enabling the operator to move to a safe distance before the liberation of the gas through disintegration of the external oil film.

As the external phase of the emulsions contemplated by the subject invention, many types of oils and oily materials have been utilized and all found chemically satisfactory. However, economy dictates the limitation of use of such materials to the hydrocarbons. Hexane, gasoline, kerosene, lubricating oil and liquid petrolatum, spindle oils, spraying oils, etc., have all been tested and found satisfactory by making the necessary adjustments as to the ratio between the external and dispersed phases, as well as adjusting the emulsifying agent ratio.

The emulsifying agent must, of course, be of such nature to form and stabilize the water-in-oil type of dispersion and not the much more common oil-in-water type. Although the water-in-oil dispersion is somewhat technically and commercially unusual, there are emulsifying agents which are effective in accomplishing the task. I have found mannide oleate to be among the more effective; others which are proprietary compounds also operate adequately. In addition to operating in the direction of forming and stabilizing water-in-oil emulsions, the emulsifying compound must be inert against the fluorine compounds; for this reason, ammonium-type emulsifiers such as the triethanolamine derivatives are not usable with materials like hydrofluosilicic acid or hydrofluoric acid.

On the other hand, when non-acid toxic compounds are used in the internal phase, as for example, with the use of water-solubilized dinitrocresol, no such limitation need be placed on the nature of the emulsifier. Similarly, when the toxic compound is nonacid and distributes itself between the two phases, as with nicotine, no such limitation need be imposed.

When the toxic compounds are of fluorine nature, they are preferably either aqueous hydrofluoric acid solutions or hydrofluosilicic acid solutions. Since dilute hydrofluosilicic acid solutions are readily available as a by-product of all superphosphate operations, these are the least costly.

In addition to the fluorine type of vaporizable insect-toxic compounds, it has been found that other vaporizable materials operate advantageously within the scope of the water-in-oil emulsion principle, the effect being not only to protect the plant wholly or in part from direct contact with the insecticide, but also significantly to decrease the vapor pressure of the insecticide and thereby increase the period of contact and protection. Free nicotine base is an example of a material which will dissolve in both the internal and external phases of an emulsion of the type indicated and will act as an effective insecticide for a longer period than the free base sprayed directly on the plant or merely dissolved in the oily medium.

Typical of compounds which, though of relatively low vapor pressure, can be used by this procedure, is dinitrocresol. Because of the highly corrosive effect of this and similar compounds, they have hitherto been limited to the dormant period of the plant season. By using water soluble modifications of the cresol, and converting its water solution into a water-in-oil emulsion, the corrosive action is minimized, while the insecticide is made available for a long period.

It is, of course, well understood that emulsions have long been used for insecticidal purposes, and such emulsions have uniformly been of the oil-in-water type, and consequently such oil-in-water emulsions would not lend themselves to the use of corrosive insecticides such as hydrofluoric and hydrofluosilicic acids. Indeed, the only purpose for adding oil in emulsified form hitherto has been merely to add an ingredient capable of imparting a plant-adherence characteristic to the insecticide composition. In my invention on the contrary, the oil phase is basically essential to the very nature of the insecticide for the protective enveloping of the aqueous phase and its corrosive contents both for the control of evaporation and to prevent direct contact of the aqueous phase with the plant.

As one example of my invention, I may cite a mixture consisting of 90 grams of kerosene, 10 grams of mannide monooleate, 540 cc. of water and 60 grams of 35% hydrofluosilicic acid solution. This emulsion is formed by dissolving the mannide monooleate in the kerosene, and then, with vigorous stirring, adding the large excess of aqueous mixture of water and hydrofluosilic acid.

It should be noted that, although the aqueous phase may be many times the oil phase in volume, this aqueous phase is the internal phase, while the quantitatively minor constituent is nevertheless the external continuous phase. It has been found that an internal aqueous phase to the extent of twenty to thirty times the volume of the external phase can be formed without "breaking" the water-in-oil emulsion. Economy is, of course, favored by this relationship.

Another example of the invention, where the emulsion is to be sprayed fairly soon after manufacture, since it is somewhat too fluid for long stability, consists of 1100 cc. of hexane, 5 grams of mannide monooleate, 1000 cc. of water and 100 cc. of hydrofluoric acid (48% concentration).

A mixture of oil constituents will be found in the formula: 400 grams hexane, 200 grams Stanco spray oil, 60 grams mannide monooleate, 6000 cc. water, and 180 grams commercial (35%) hydrofluosilicic acid.

As an example of the non-fluoride type of insecticide, I may cite the following: 400 grams hexane, 200 grams Stanco spray oil, 60 grams mannide monooleate, 6000 cc. water and 70 grams free nicotine base.

For commercial handling, emulsions can be made up in fairly stiff gel form and shipped in such semi-solid state, then before use the material may be brought into sprayable consistency by dilution with any oil type solvent such as gasoline, kerosene, lubricating oil, etc. The use of the term "emulsion" in this specification, including the claims, is therefore to be understood as including semi-gelatinous and gelations bi-phase combinations of an external oily phase and an internal aqueous phase, the latter containing all or part of the insect-toxic or fumigant substance.

It is to be understood that the term "oil" as herein employed is to be interpreted as used in normal colloid chemical terminology with oil representing any nonaqueous phase of organic nature in which the organic portion of the molecules is significantly greater in solubility effect than any polar portions of the molecules. This will particularly include such materials as hydrocarbons (aliphatic, aromatic and terpene).

While I have in the above description disclosed what I believe to be a preferred and practical embodiment of the invention, it will be understood to those skilled in the art that the specific examples set out are merely illustrative of the broad principle of the invention which is defined in the appended claims.

What I claim is:

1. An insecticide comprising an emulsion consisting of the following ingredients in substantially the stated proportions: kerosene 90 grams, water 540 cc., 35% hydrofluosilicic acid, 60 grams, in aqueous solution with said water, and mannide monooleate 10 grams.

2. An insecticide comprising an emulsion including an external phase of hydrocarbon oil and an internal phase containing in solution a compound selected from the group consisting of hydrofluoric acid, hydrofluosilicic acid; and mannide monooleate as a stabilizer of the emulsion.

MENAHEM MERLUB-SOBEL.